No. 715,468. Patented Dec. 9, 1902.
T. R. FERRALL.
BEARING FOR SHEAVES.
(Application filed Mar. 19, 1902.)
(No Model.)
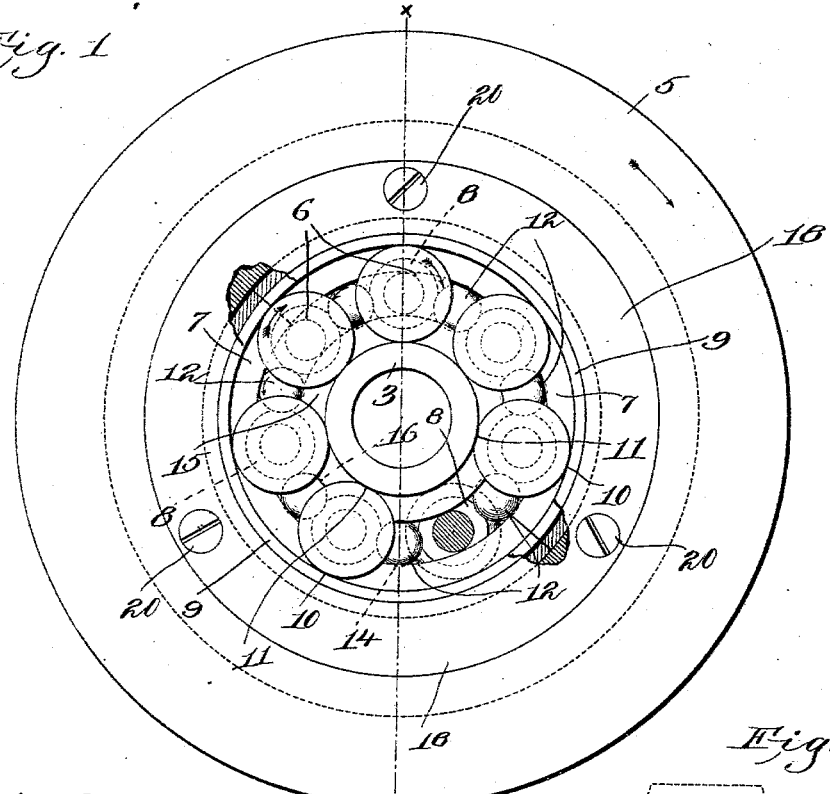
Fig. 1
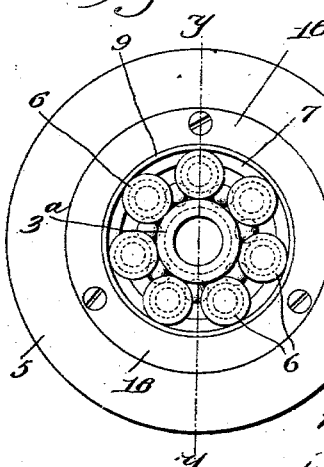
Fig. 3
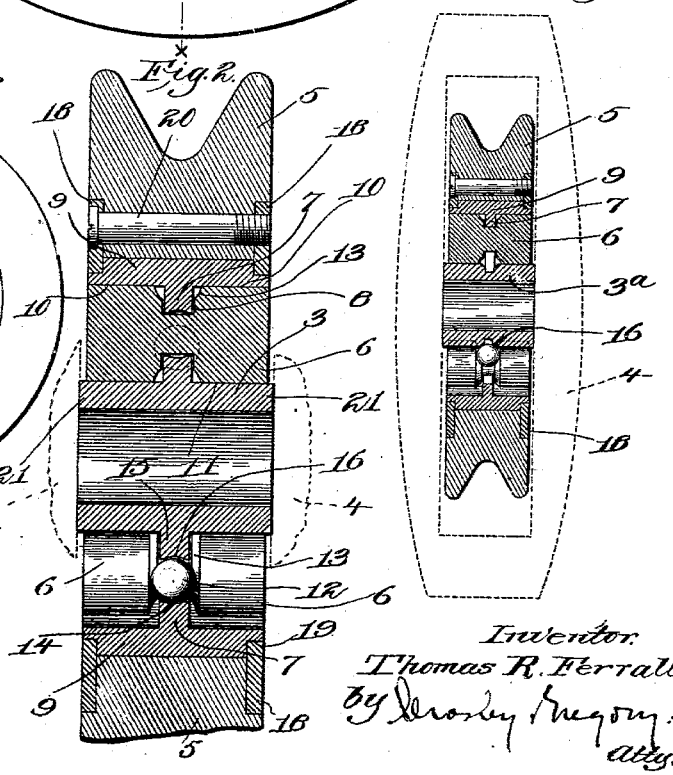
Fig. 2
Fig. 4
Witnesses.
W. C. Lunsford.
H. J. Sartoris.
Inventor.
Thomas R. Ferrall.
By Crosby Gregory
Attys
THE NORRIS PETERS CO., PHOTO-LITHO., WASHINGTON, D. C.

UNITED STATES PATENT OFFICE.

THOMAS R. FERRALL, OF WINTHROP, MASSACHUSETTS, ASSIGNOR TO BOSTON & LOCKPORT BLOCK COMPANY, OF BOSTON, MASSACHUSETTS, A CORPORATION OF NEW JERSEY.

BEARING FOR SHEAVES.

SPECIFICATION forming part of Letters Patent No. 715,468, dated December 9, 1902.

Application filed March 19, 1902. Serial No. 98,936. (No model.)

*To all whom it may concern:*

Be it known that I, THOMAS R. FERRALL, a citizen of the United States, and a resident of Winthrop, county of Suffolk, and State of Massachusetts, have invented an Improvement in Bearings for Sheaves, of which the following description, in connection with the accompanying drawings, is a specification, like numerals on the drawings representing like parts.

This invention relates to sheaves for pulley-blocks and similar devices, and has for its object to provide a novel form of antifriction or roller bearing for said sheaves. In the ordinary pulley-block the width or thickness of the sheave is only slightly less than the width of the sheave-receiving opening in the block and the faces of the sheave are only slightly separated from the walls of said opening. It is desirable that the bearing for the sheave should be as long as possible, and by my invention I have provided a roller-bearing wherein the ends of the rolls come substantially flush with the faces of the sheave and wherein means intermediate the ends of the rolls are provided for retaining the said rolls in position. I have also provided antifriction spacing members between the rolls. The particular construction comprises a central bearing member in the form of a sleeve, through which is adapted to be inserted the pin on which the sheave is supported in the pulley-block, a sheave or rope receiving portion rotatable about the central sleeve, and antifriction-rolls between the rope-receiving portion and the sleeve. Each of the rolls has an annular groove intermediate its ends, and the sheave or rope receiving portion is provided with an annular rib which enters the said grooves and which serves to retain the rolls against longitudinal movement. By means of this construction I can make the rolls of such a length that the ends thereof will come flush with the faces of the sheave. Between the rolls are antifriction-balls, which are partially received by concave annular grooves in the rolls and partially by a concave annular groove in the central bearing member.

Other features of my invention will be more particularly pointed out in the description and claims.

Figure 1 is a side elevation of a sheave constructed in accordance with one form of my invention. Fig. 2 is a section on the line $x\ x$, Fig. 1. Fig. 3 is a side elevation of a sheave embodying a form of my invention. Fig. 4 is a section on the line $y\ y$, Fig. 3.

Since my invention relates to the bearing for the sheave I have not deemed it necessary to show any block or other supporting means for the sheave.

3 designates a suitable bushing or sleeve through which the usual pin or shaft upon which the sheave is supported is passed, the said pin being supported in the usual casing 4 of the pulley-block (see dotted lines, Fig. 4) in any suitable way. This sleeve 3 may either be loose upon the pin or keyed thereto, as desired.

5 designates the sheave, and between the same and the bearing member and forming an antifriction-bearing for the sheave 5 are the rolls 6, which it will be noted are of such a length that their ends come flush with the faces of the sheave. In order to retain the rolls in place and hold the same against movement in the direction of their length, I have provided an annular retaining-rib 7, which is received in annular grooves 8 in the rolls intermediate their ends. The rib 7 will preferably be made integral with a suitable box or wearing-ring 9, which forms the lining of the central aperture of the sheave and which has at each side thereof the tracks 10, on which the ends of the rolls 6 run. The central bearing member 3 also has the tracks 11 at each end thereof, on which the rolls run.

In order that the sheave may run easily, it is necessary to properly space the rolls 6, and I accomplish this by means of antifriction spacing or separator members 12, which are preferably in the form of balls, one of said balls being situated between each two adjacent rolls.

In the form of my invention illustrated in Fig. 2 the grooves 8 in each of the rolls 6 have their edges concaved, as at 13, to form a bearing-surface for the balls 12, and the retaining-rib 7 has its edge also concaved, as at 14, the balls 12 being received partially in the concaved portions 13 of the grooves 8 and the concaved recess 14 in the rib 7. To further assist in holding the balls in place, I provide the sleeve 3 with the rib 15, which has its edge concaved, as shown at 16.

In constructing my device the space between the concaved faces 16 and 14 of the ribs 15 and 7 is slightly greater than the diameter of the balls 12, so that the said balls will not be in contact with both of said ribs at the same time.

In the operation of the device assuming that the sheave is rotating in the direction of the arrow, Fig. 1, it will be seen that the same will be supported upon the rolls 6 and the rolls will travel in the direction of the arrows, said rolls rolling over the tracks 11 on the central bearing member 3 and also having a rolling contact with the tracks 10 on the sheave 5. The spacing-balls 12 being in engagement with the rolls 6 will rotate in an opposite direction from the rolls, as indicated by the arrows in Fig. 1, and under ordinary circumstances said spacing-rolls will have no appreciable contact with either of the surfaces 14 and 16.

The object in making the surfaces 14 and 16 concaved is to form a sort of cage to receive the balls 12 and prevent the same from dropping out laterally from between the rolls 6 if said rolls should become worn.

In order to assemble the parts, it is necessary to split the ring or box 9, and to provide acceptable means for holding the parts of the box together and securing said box to the sheave 5, which means shall not project beyond the faces of the sheave, I prefer to use the annular locking members 18, which are received in suitable circular recesses in the faces of the sheave 5, and the inner edges of which engage a rabbeted portion 19 of the box 9.

Any suitable means may be employed to secure the locking members 18 to the sheave, and I have herein illustrated for this purpose the bolts 20.

In Figs. 3 and 4 I have shown a slightly different form of my invention, the difference lying in the location of the spacing-balls 12. In this form of my invention the sheave 5, having the wearing ring or box 9, provided with the rib 7, which enters grooves in the rolls 6, is the same as that shown in Fig. 2. The concaved surface 16 in this form of my invention, however, is formed in the body of the central bearing member 3ª instead of in the face of the rib 15, as in Fig. 2, and the spacing-balls 12 consequently will travel in a circular path having a smaller diameter. In other respects, however, the invention of Figs. 3 and 4 is the same as that of Fig. 2.

It will be observed from the above that by means of my invention I am enabled to secure a roller-bearing of the full width of the sheave, a feature which I consider to be quite important.

As illustrated in Figs. 2 and 4, I may, if desired, make the sleeve 3 slightly longer than the width of the sheave, so as to provide the sheave with projecting portions 21, which by their engagement with the inside strapping of the block serve to center the sheave and prevent the faces thereof from having rubbing contact with the block.

Another important advantage which I secure by reason of my construction is that all of the parts of the roller-bearing are securely held in and carried by the sheave, so that the sheave can be taken from the pulley-block and transported without danger of any of the balls or rolls falling out, for it will be observed that the rib 7 prevents the rolls 6 from being displaced, and in the form of my invention shown in Fig. 2 the rolls 6 in turn hold the bushing 3 in position through the rib 15. As I have stated above, the spacing-balls 12 are held in position by being confined between the concaved faces 14 and 16.

In the form of my invention shown in Fig. 4 the balls 12 are held in position by being partially received in the concaved groove 16 and partially in the concaved portions of the groove in the rolls 6, and the balls 12 by being received in the concaved groove 16 serve to prevent the sleeve or bushing 3ª from becoming displaced.

While I have illustrated and described my invention as especially applicable to sheaves for pulley-blocks, yet I desire to state that the form of bearing herein illustrated may be used in connection with any sheave or pulley to whatever use the said sheave may be applied.

Another advantage which I secure by means of my construction is the great facility with which the structure may be dismantled and the parts removed for cleaning or repair. It will be observed that by merely removing the bolts or screws 20 the locking members 18 may be removed when the box and the anti-friction-rolls may be removed from the machine.

I desire to state that various changes may be made in the construction of the device without departing from the spirit of the invention.

Having thus fully described my invention, what I claim as new, and desire to secure by Letters Patent, is—

1. In a device of the class specified, a central cylindrical bearing member having on its exterior an annular rib, a sheave rotatable about said bearing member, and having on its interior an annular rib which is in alinement with the rib on the bearing member, annularly-grooved antifriction-rolls between the sheave and the bearing member, the ribs on both the sheave and the bearing member entering the grooves in the rolls, and spacing-balls between adjacent rolls, said balls being confined between the ribs.

2. In a device of the class specified, a central cylindrical bearing member having an exterior annular rib, a sheave rotatable thereabout and having an interior annular rib which is in alinement with the rib on the bearing member, annularly-grooved antifriction-rolls between the sheave and the bearing member, the ribs on both the sheave and the bearing member entering the grooves in the rolls, and having their opposed faces concaved, and spacing-balls between adjacent rolls, said balls being confined between the concaved faces of the ribs.

3. In a device of the class specified, a central cylindrical bearing member having an exterior annular rib, a sheave rotatable thereabout and having an interior annular rib which is in alinement with the rib on the bearing member, annularly-grooved antifriction-rolls between the sheave and the bearing member, the ribs on both the sheave and the bearing member entering the grooves in the rolls, and having their opposed faces concaved, and spacing-balls between adjacent rolls, said balls being confined between the concaved faces of the ribs, and the diameter of the balls being slightly less than the distance between the ribs.

4. In a device of the class specified, a sleeve provided with an annular concaved groove, a sheave rotatable about said sleeve, and having on its interior an annular rib provided with a concaved face, antifriction-rolls between the sheave and sleeve, said rolls each having an annular concaved groove intermediate its ends which receives the rib on the sheave, spacing-balls between adjacent rolls, said balls being received partially in the grooves in the rolls and being confined between the concaved face of the rib and the groove in the sleeve.

5. In a device of the class described, a central, cylindrical bearing member having an annular groove, a sheave rotatable about said member and supported thereby, antifriction cylindrical rolls between the bearing member and sheave, each of said rollers having an annular concave groove therein intermediate its ends, and spacing-balls between the rolls, said balls being received partially in the grooves in the rolls and partially in the groove in the bearing member.

6. In a sheave, a central bearing member, a sheave rotatable thereabout, a split box carried by the sheave, a plurality of antifriction-rolls between the box and the bearing member, said box having means to engage the rolls intermediate their ends and retain the latter in position, and a circular locking member in the side face of the sheave and serving to hold the box in position.

7. In a device of the class specified, a central bearing member, a sheave rotatable thereabout, a split box carried by the sheave, a plurality of antifriction-rolls between the box and the bearing member, means carried by the box to engage the rolls intermediate their ends, and hold them in position, said box being rabbeted on its outer edges, and a circular locking member seated in a recess in each face of the sheave and engaging said rabbeted portion of the box, said locking member coming flush with the face of the sheave and serving to hold the same in place.

In testimony whereof I have signed my name to this specification in the presence of two subscribing witnesses.

THOMAS R. FERRALL.

Witnesses:
LOUIS C. SMITH,
JOHN C. EDWARDS.